US005950773A

United States Patent [19]
Ito

[11] Patent Number: 5,950,773
[45] Date of Patent: Sep. 14, 1999

[54] BRAKING APPARATUS FOR A LINEAR MOTION GUIDING APPARATUS

[75] Inventor: Osamu Ito, Kanagawa, Japan

[73] Assignee: Nippon Thompson Co., Ltd., Tokyo, Japan

[21] Appl. No.: 08/925,758

[22] Filed: Sep. 9, 1997

[30] Foreign Application Priority Data

Sep. 10, 1996 [JP] Japan .................................. 8-261393

[51] Int. Cl.⁶ .................................................. B65H 59/10

[52] U.S. Cl. ............................................. 188/67; 188/28

[58] Field of Search ................................ 188/41, 42, 43, 188/44, 45, 67, 83, 28

[56] References Cited

U.S. PATENT DOCUMENTS

| 4,926,982 | 5/1990 | Granbom | 188/67 |
| 5,435,477 | 7/1995 | Torihata et al. | 228/4.5 |
| 5,473,992 | 12/1995 | Takei | 188/36 |
| 5,678,663 | 10/1997 | Watanabe et al. | 188/67 |
| 5,732,799 | 3/1998 | Chikamatsu et al. | 188/67 |

*Primary Examiner*—Robert J. Oberleitner
*Assistant Examiner*—Robert A. Siconolfi
*Attorney, Agent, or Firm*—Sughrue, Mion, Zinn, Macpeak & Seas, PLLC

[57] ABSTRACT

The present invention relates to a braking apparatus for a linear motion guiding apparatus that is able to completely stop a moving portion in the form of table 2 at a desired position by performing braking action by causing a linear motion actuator in the form of a piezoelectric actuator and so forth to activate friction members 58 and 59.

5 Claims, 8 Drawing Sheets

BRAKING APPARATUS FOR A LINEAR MOTION GUIDING APPARATUS

BACKGROUND OF THE INVENTION

1. Field of the Invention

The present invention relates to a braking apparatus for a linear motion guiding apparatus equipped on, for example, a machine tool or industrial robot, that guides an object with high precision.

2. Description of the Prior Art

Figure 1:
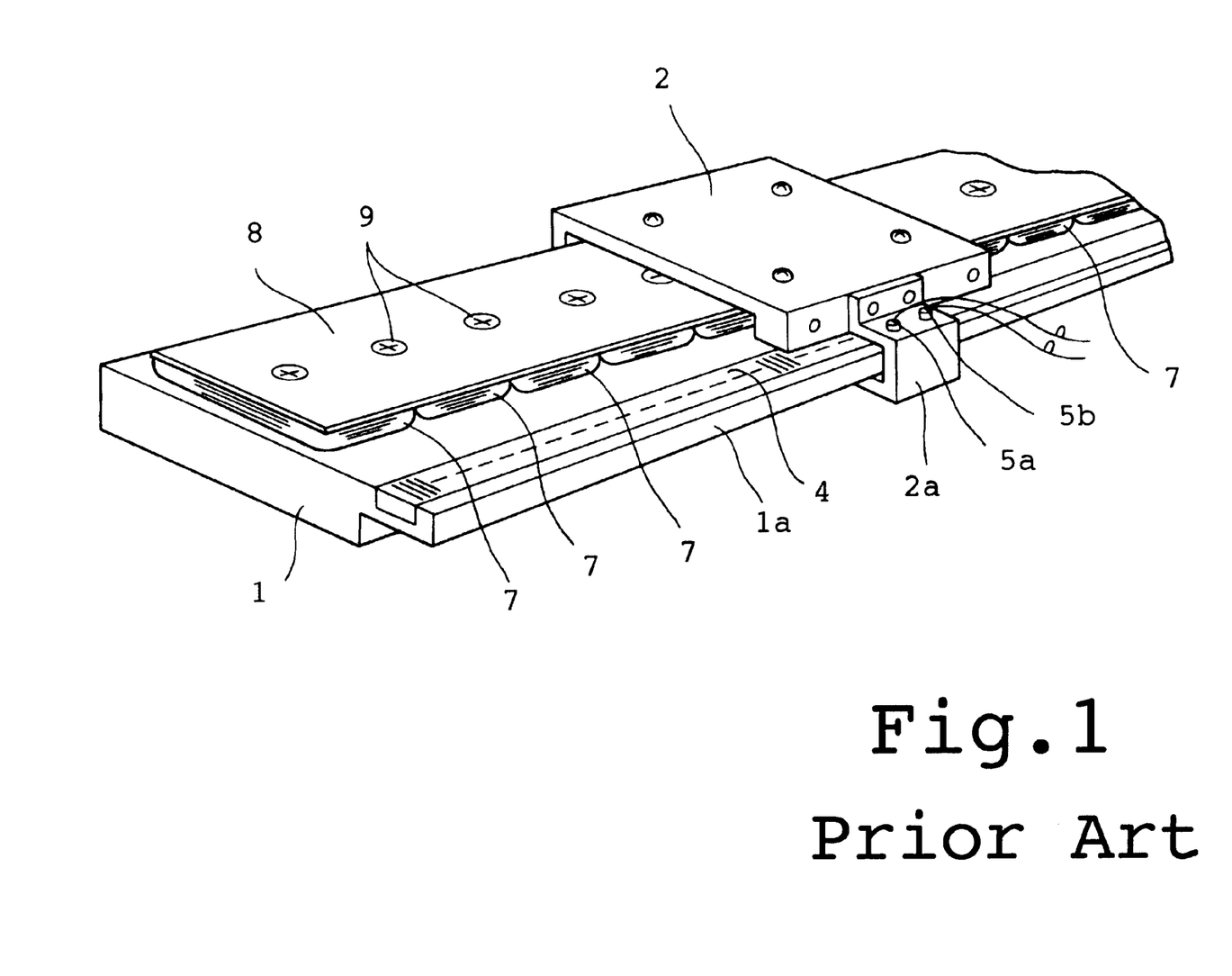
FIG. 1 is a perspective view showing the essential portion of a linear motion guiding apparatus of the prior art.

An example of this type of linear motion guiding apparatus of the prior art is shown in FIG. 1.

As shown in the drawing, this linear motion guiding apparatus has a guiding device composed of a bed in the form of long base member 1 and a table in the form of moving body 2 that moves on base member 1. A plurality of rollers (not shown) are provided in this moving body 2, and these rollers roll along a track (not shown) formed along the lengthwise direction of base member 1.

Overhang 1a is formed on one side of base member 1, and linear scale 4 is provided in this overhang 1a. On the other hand, light emitting element 5a and light receiving element 5b are provided on the side of moving body 2 by means of bracket 2a. A detection device for detecting the position of moving body 2 relative to base member 1 is composed by this linear scale 4, light emitting element 5a and light receiving element 5b.

A linear direct current motor, which composes the linear motion guiding apparatus with the guiding device, is composed of a primary side, equipped with a plurality of armature coils 7 arranged in a row in the lengthwise direction of base member 1 on base member 1, and a secondary side, having a field magnet (not shown) attached to the lower surface of moving body 2 in opposition to each armature coil 7. Each armature coil 7 is adhered to coil substrate 8, and fastened with coil substrate 8 to base member 1 by screws 9.

In addition, the field magnet is magnetized so that a plurality of N and S magnetic poles are alternately arranged in a row in the direction in which moving body 2 moves, namely along the lengthwise direction of base member 1.

In the constitution described above, by supplying electrical power at a prescribed timing to each armature coil 7, thrust is generated between both the primary and secondary sides based on Fleming's left hand rule to move and position moving body 2, integrated into a single unit with the secondary side. The position of moving body 2 is then detected by the detection device described above.

In this linear motion guiding apparatus of the prior art, since the moving portion that is positioned only stops by using magnetic force as the braking force, it is unstable under conditions in which vibrations and so forth are applied from the outside. In addition, in the case the supply of electrical power is interrupted for some reason such as a power outage, braking force does not act at all, thus resulting in the problem of causing a situation in which the moving portion falls when using the linear motion guiding apparatus for an upright shaft (in which the direction of operation is vertical) or a state which approximates such.

SUMMARY OF THE INVENTION

The object of the present invention is to provide a braking apparatus for a linear motion guiding apparatus that is able to completely stop a moving portion at a desired position.

In addition, the present invention provides a braking apparatus that also is able to demonstrate other effects.

The braking apparatus according to the present invention is arranged on a linear motion guiding apparatus that has a bed and table able to move freely relative to each other and guides an object with linear movement, and is comprised of a linear motion actuator that is linearly displaced by supplying electrical power, a partner member that extends in the direction of relative movement, and a notch enlargement mechanism member that, together with movably supporting friction members that make contact with the partner member to perform braking, enlarges the displacement of the linear motion actuator to perform the movement of the friction members.

In addition, the braking apparatus according to the present invention is arranged on a linear motion guiding apparatus in which a bed and table that are able to move freely relative to each other are mutually and respectively coupled to the primary side and secondary side of a linear motor, and is comprised of a linear motion actuator that is linearly displaced by supplying electrical power, a partner member that extends in the direction of relative movement, and a notch enlargement mechanism member that, together with movably supporting friction members that make contact with the partner member to perform braking, enlarges the displacement of the linear motion actuator to perform the movement of the friction members.

In addition, the notch enlargement mechanism member according to the present invention performs braking by causing the friction members to make contact with the partner member due to their own resilient restorative force when electrical power is not supplied, and cancels braking by activating the linear motion actuator by supplying electrical power to move the friction members away from the partner member.

In addition, in the braking apparatus according to the present invention, the partner member is a band-shaped member, while the linear motion actuator is composed of a laminated piezoelectric actuator.

Moreover, in the braking apparatus, the friction members and notch enlargement mechanism member are integrated into a single unit.

DESCRIPTION OF THE PREFERRED EMBODIMENTS

The following provides an explanation of a linear motion guiding apparatus equipped with the braking apparatus according to the present invention using the drawings.

Furthermore, the linear motor used as a driving force generation device of the linear motion guiding apparatus is a linear direct current motor, and in this case, is of the moving magnet type. In the following explanation of the preferred embodiments, the primary side of the linear direct current motor is taken to be the stationary side as well as the power supply side, while the secondary side is taken to be the moving side.

The following provides an explanation of the guiding device that mutually guides the primary and secondary sides of the linear motion guiding apparatus.

Figure 2:
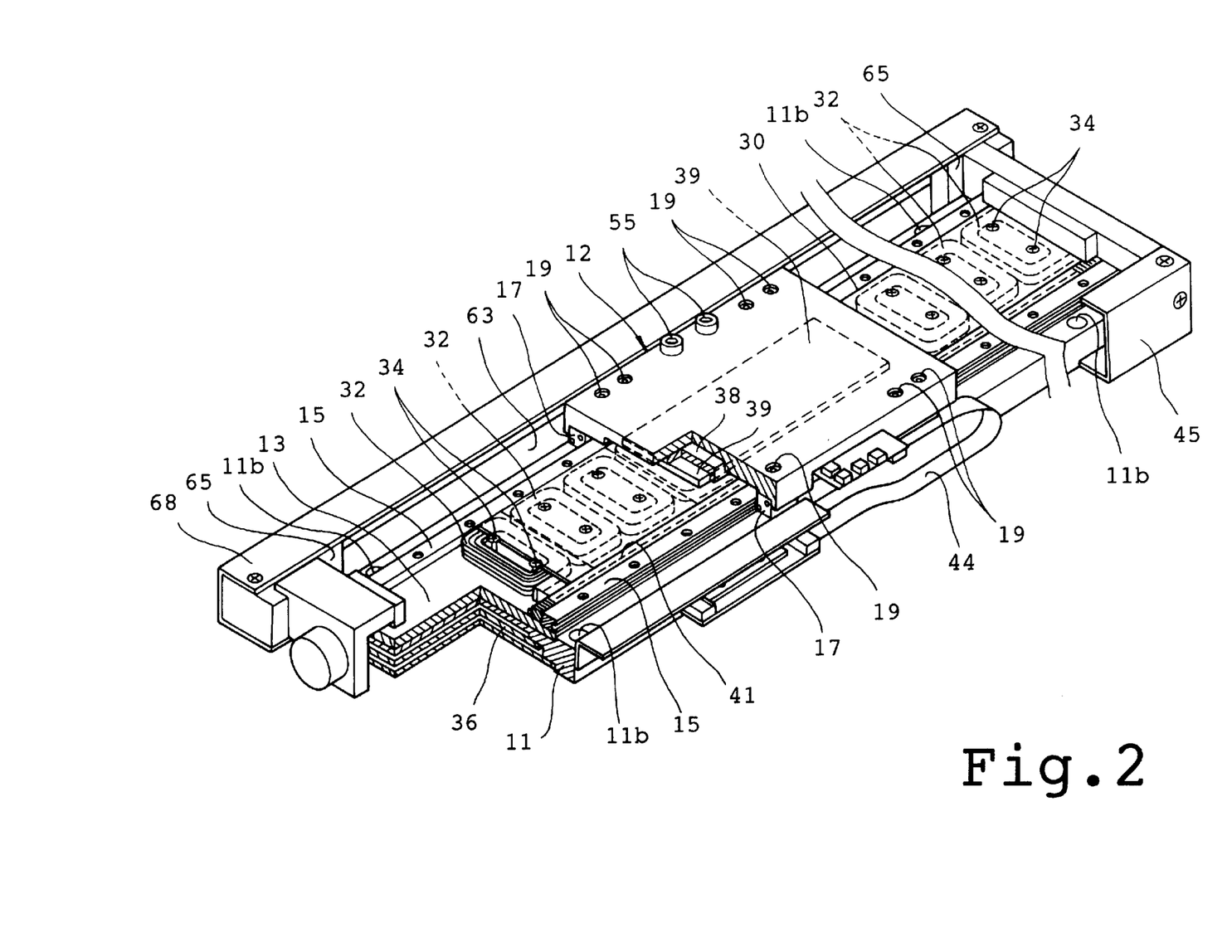
FIG. 2 is a perspective view of a linear motion guiding apparatus as claimed in the present invention.
Figure 3:
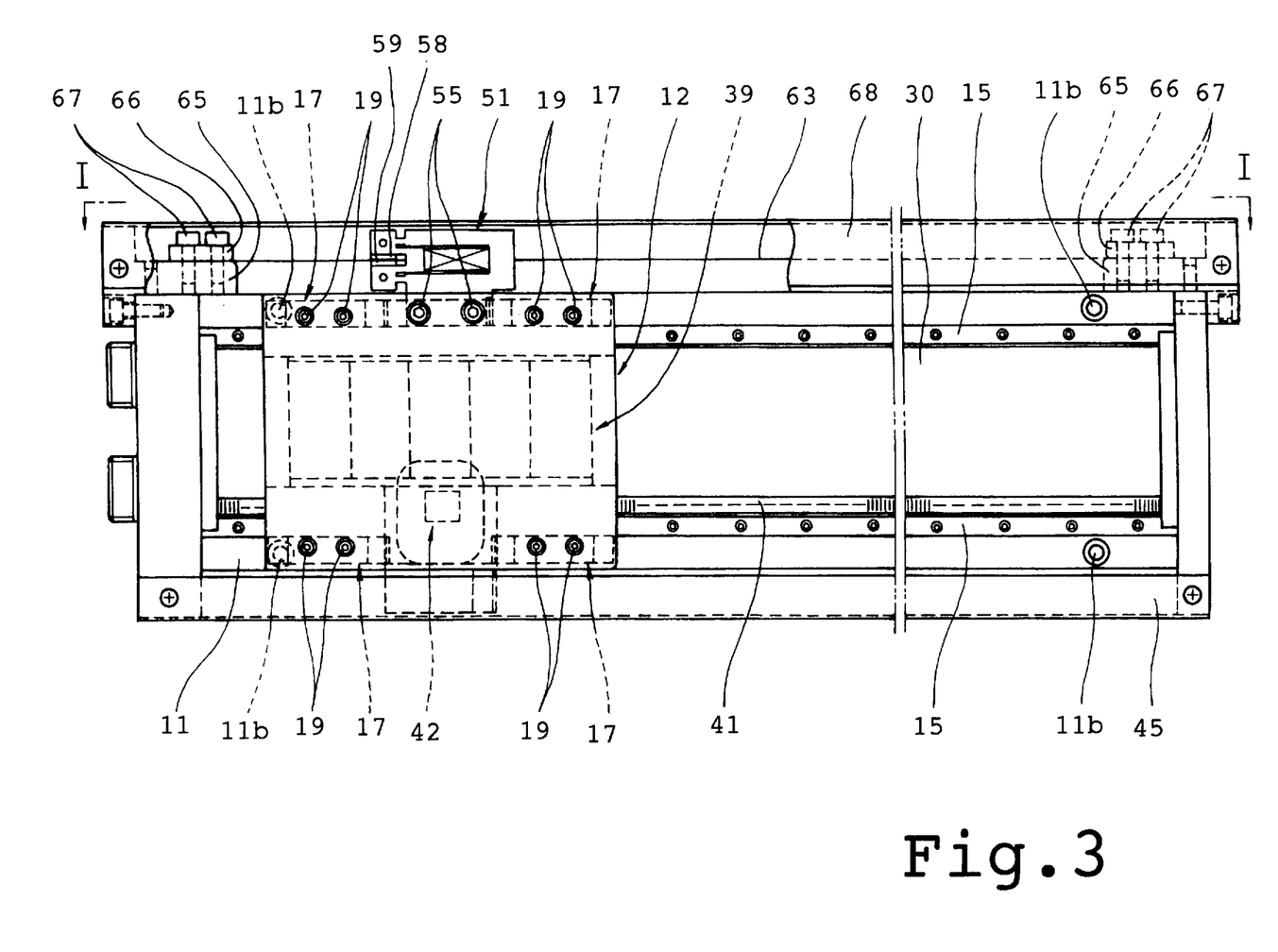
FIG. 3 is an overhead view of the linear motion guiding apparatus shown in FIG. 2.
Figure 4:
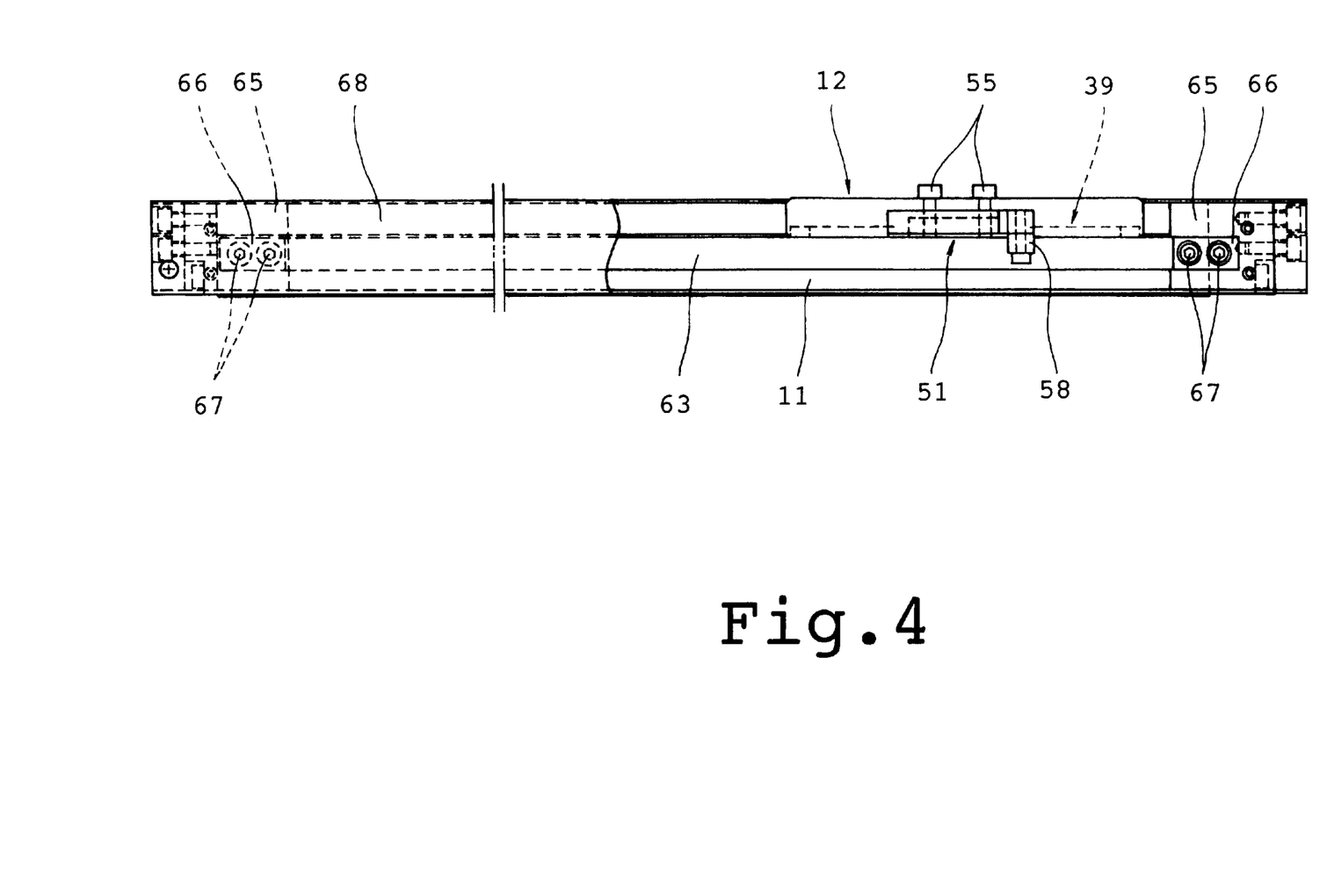
FIG. 4 is a view taken along arrows I—I relating to FIG. 3.

This guiding device has bed 11, roughly in the shape of a rectangular plate, and table 12 that moves in the lengthwise direction of bed 11 as shown in FIGS. 2 through 4. As shown in FIG. 2, coil yoke 13 arranged on the upper surface of bed 11 is fastened to bed 11. This coil yoke 13 is composed to be in roughly the shape of a rectangular plate having roughly the same length as bed 11.

Two track rails 15 are provided on both the left and right sides in the upper surface of coil yoke 13. Track rails 15 are arranged along the lengthwise direction of coil yoke 13 and fastened to coil yoke 13.

Figure 5:
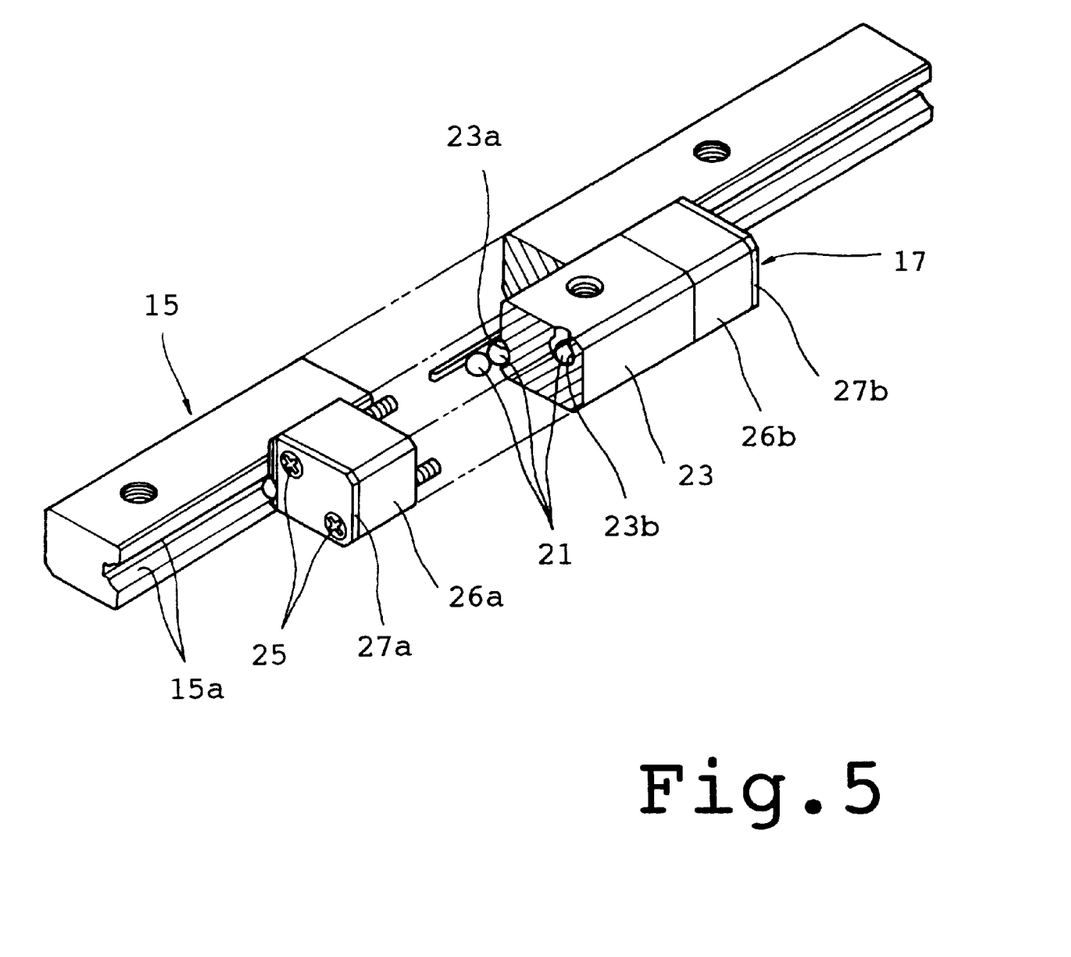
FIG. 5 is a perspective view, including a partial cross-section, of a track rail and slide member of the linear motion guiding apparatus shown in FIGS. 2 through 4.

As shown in FIG. 5, one track groove 15a, having a roughly semicircular cross-section, is formed in the outside of track rail 15. Slide member 17, able to move freely relative to track rail 15, is arranged on the outside of track rail 15. This slide member 17 is fastened to the lower surface of table 12 by bolts (with hexagon sockets) 19. As shown in FIG. 3, two slide members 17 each are provided for each track rail 15.

As shown in FIG. 5, a rolling element circulating path is formed in slide member 17 corresponding to track groove 15a of track rail 15, and a large number of rolling elements in the form of balls 21 are arranged and contained in this rolling element circulating path. These balls 21 circulate while rolling over track groove 15a of track rail 15 and bearing the load accompanying movement of slide member 17 relative to track rail 15.

Slide member 17 is composed of casing 23, a pair of end caps 26a and 26b fastened by small screws 25 to both ends of casing 23, and seals 27a and 27b fastened to the outsides of end caps 26a and 26b.

The rolling element circulating path is composed of load bearing track groove 23a, formed so as to pass linearly through casing 23 in opposition and parallel to track groove 15a of track rail 15, return path 23b parallel to load bearing track groove 23a, and a pair of roughly semi-circular direction changing paths (not shown) formed in each end cap 26a and 26b that connect the corresponding ends of load bearing track groove 23a and return path 23b. Accordingly, table 12 is composed so as to move freely relative to the lengthwise direction of bed 11 in the form of a linear motion rolling guiding device that guides an object with linear movement.

Since the guiding device is fastened with a plurality of bolts (not shown) to a flat mounting surface provided on, for example, a machine tool, as shown in FIGS. 2 and 3, insertion holes 11b are formed in both ends of bed 11 for fastening bed 11 to a mounting surface with bolts.

Next, the following provides an explanation of the primary and secondary sides of a linear direct current motor that is mutually guided by the guiding device.

As shown in FIG. 2, the primary side of the linear direct current motor is composed of coil yoke 13 loaded on bed 11, coil substrate 30 (also shown in FIG. 3) arranged on the upper surface of coil yoke 13 along the lengthwise direction of coil yoke 13, and, for example 14 armature coils, adhered to the lower surface of coil substrate 30 and arranged in a row along the direction of movement of table 12. In addition, a Hall effect element not shown is respectively arranged in each armature coil 32.

As shown in FIG. 2, each armature coil 32 is fastened with coil substrate 30 to coil yoke 13 by, for example, 2 each of inserted small screws 34.

In addition, circuit board 36 for supplying electrical power and so forth to each armature coil 32 is arranged on the lower surface of bed 11.

On the other hand, as shown in FIG. 2, the secondary side of the linear direct current motor is composed of magnet yoke 38 mounted on the lower surface of table 12, and field magnet 39 (also shown in FIGS. 3 and 4) mounted on the lower surface of magnet yoke 38 in opposition to each armature coil 32 of the primary side.

Figure 6:
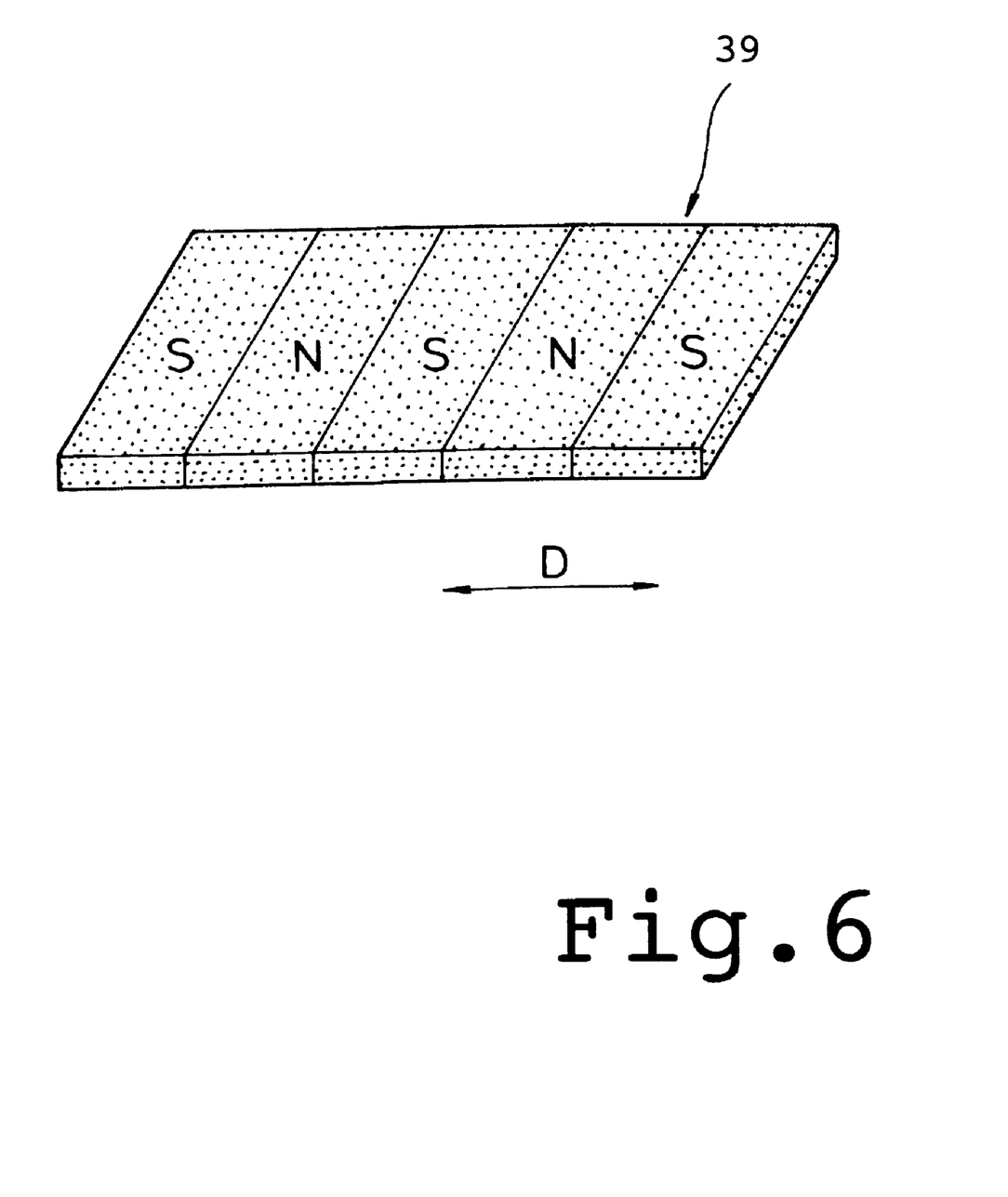
FIG. 6 is a perspective view of a field magnet of the linear direct current motor shown in FIGS. 2 through 4.

As shown in FIG. 6, this field magnet 39 is formed in the shape of a rectangular plate, and is magnetized so that a plurality of N and S magnetic poles, for example five, are alternately arranged in a row in direction D of the relative movement of the primary and secondary sides.

This linear motion guiding apparatus is equipped with a position detection device that detects the relative positions of bed 11 and table 12, and this position detection device is composed of linear magnetic scale 41 and sensor 42 shown in FIGS. 2 and 3. Linear magnetic scale 41 extends in the direction of movement of table 12, and together with a plurality of N and S magnetic poles being alternately magnetized at a fine pitch in its lengthwise direction, a magnetic pole for an origin signal is formed on one end. In addition to sensor 42 being provided with a magnetic resistance element (MR element) for detection of the origin, two electromagnetic conversion elements for the A and B phases are arranged mutually shifted by ½ the magnetization pitch described above. As a result of employing this constitution, signals are obtained for the A and B phases thereby allowing detection of relative position and determination of the direction of movement.

As shown in FIGS. 2 and 3, flexible substrate 44 performs removal of signals from sensor 42, while cover 45 covers flexible substrate 44.

As a result of employing this constitution, by supplying electrical current at the prescribed timing to each armature coil 32, thrust is generated between both the primary and secondary sides based on Fleming's left hand rule, and, for example, if bed 11 to which the primary side is coupled is taken to be the stationary side, table 12 integrated into a single unit with the secondary side is moved by this thrust. Relative position is then detected by the position detection device described above.

As shown in FIGS. 3 and 4, this linear motion guiding apparatus is equipped with braking apparatus 51 that slows down and stops the relative movement of bed 11 and table 12.

Figure 7A:
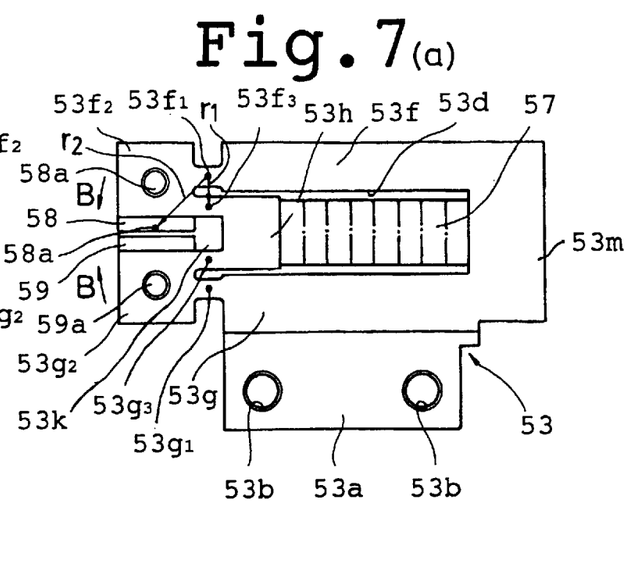
FIG. 7 is a drawing showing the braking apparatus of the linear motion guiding apparatus shown in FIGS. 2 through 4.
Figure 7B:
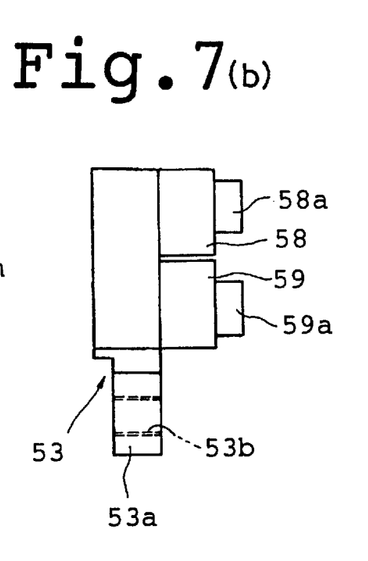
Figure 7C:
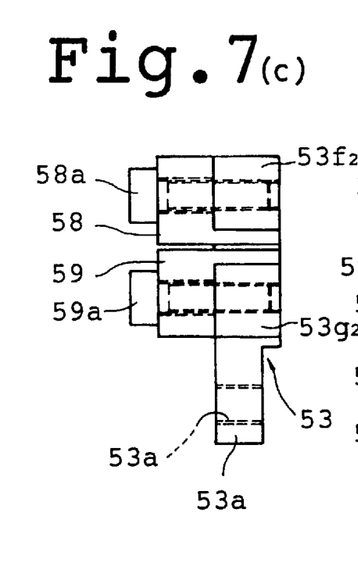
Figure 7D:
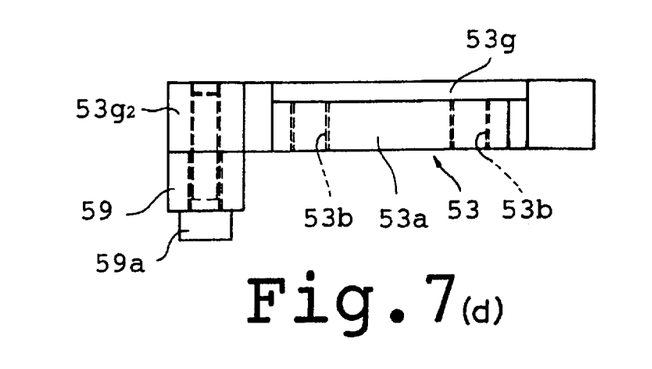

FIG. 7 shows the essential portion of braking apparatus 51, while FIGS. 7(a), (b), (c) and (d) indicate its overhead view, right side view, left side view and front view, respectively.

Braking apparatus 51 shown in FIG. 7 has a brake body in the form of notch enlargement mechanism member 53. Metal and so forth is selected for the material of this notch enlargement mechanism member 53, and it is formed by, for example, cutting a notch out of the material with a wire cutters and so forth. Overhang 53a is formed on one side of this notch enlargement mechanism member 53, and two threaded holes 53b are provided in this overhang 53a. This notch enlargement mechanism member 53 is fixed to table 12 by screwing in bolts (with hexagon sockets) shown in FIGS. 2 through 4 into threaded holes 53b.

Hollow portion 53d is formed in the notch enlargement mechanism member 53 shown in FIG. 7(a), and this notch enlargement mechanism member 53 is formed into a single unit with bottom 53m, base portions 53f and 53g connected on both sides and extending at a right angle from bottom 53m, constricted portions $53f_1$ and $53g_1$ on one end of base portions 53f and 53g, attaching portions $53f_2$ and $53g_2$ connected to constricted portions $53f_1$ and $53g_1$, other constricted portions $53f_3$ and $53g_3$ connected to attaching portions $53f_2$ and $53g_2$ and in parallel with the constricted portions $53f_1$ and $53g_1$, and contact portion 53h connected to the other constricted portions $53f_3$ and $53g_3$.

In addition, overhang 53a is formed into a single unit with one of the base portions 53g.

In addition, opening 53k is formed to serve as a grip between attaching portion $53f_2$ and attaching portion $53g_2$.

A linear motion actuator in the form of piezoelectric actuator 57 is arranged within hollow portion 53d of notch enlargement mechanism member 53 that generates linear displacement in proportion to a voltage when a voltage is applied. One end of this piezoelectric actuator 57 is attached to contact portion 53h, while the other end is attached to bottom 53m.

Figure 8A:
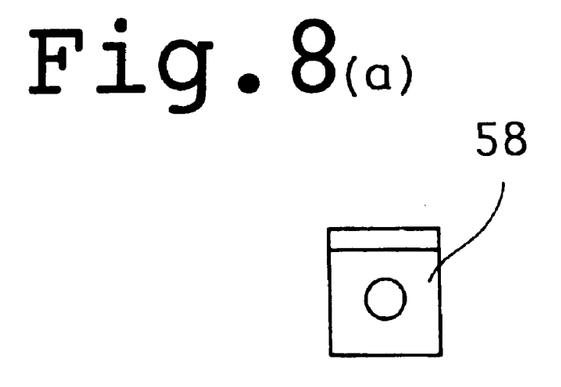
FIG. 8 is a drawing showing a friction member in the form of a brake pad of the braking apparatus shown in FIG. 7.
Figure 8B:
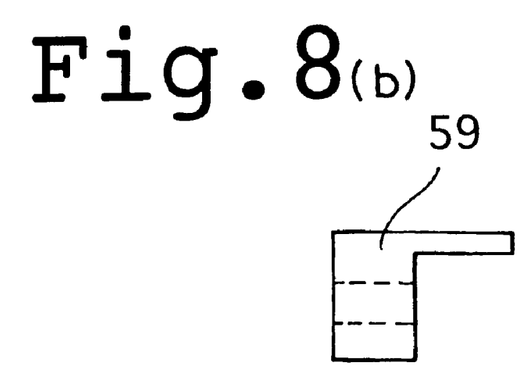

As shown in FIGS. 7(a) through 7(d), friction members in the form of brake pads 58 and 59 formed from a frictional material such as metal are fastened to attaching portions $53f_2$ and $53g_2$ by bolts 58a and 59a so as to look into opening 53k. These brake pads 58 and 59 are of the same shape, and an overhead view and left side view of one of the brake pads, brake pad 58, are shown in FIGS. 8(a) and 8(b), respectively.

Brake pads 58 and 59 are movably supported by notch enlargement mechanism member 53. Piezoelectric actuator 57 arranged within hollow portion 53d of notch enlargement mechanism member 53 that generates an acting force displaces linearly when electrical power is supplied. Namely, when it extends, contact portion 53h displaces relative to bottom 53m of notch enlargement mechanism member 53, the other constricted portions $53f_3$ and $53g_3$ connected to contact portion 53h serve as a power point causing the displacement to be transmitted to attaching portions $53f_2$ and $53g_2$, at which time attaching portions $53f_2$ and $53g_2$ are displaced at an angle accompanying bending displacement of each constricted portion $53f_1$, $53g_1$, $53f_3$ and $53g_3$ as a result of constricted portions $53f_1$ and $53g_1$ on the ends of base portions 53f and 53g serving as fulcrum points. This being the case, the mouth of opening 53k between attaching portion $53f_2$ and $53g_2$ opens.

Next, when the supply of electrical power to piezoelectric actuator 57 is cut off, piezoelectric actuator 57 returns to its original position. When its acting force is no longer present, constricted portions $53f_1$, $53g_1$, $53f_3$ and $53g_3$ that had undergone bending displacement attempt to return to their original positions. Namely, the angular displacement of attaching portions $53f_2$ and $53g_2$ returns to its original state due to the action of their own resilient restorative force. This being the case, the mouth of opening 53k between attaching portion $53f_2$ and $53g_2$ closes.

Brake pads 58 and 59 fastened to attaching portions $53f_2$ and $53g_2$ are moved as a result of the mouth of opening 53k of notch enlargement mechanism member 53 opening and closing in this manner.

As shown in FIGS. 2 through 4, brake pads 58 and 59 are provided so as to clamp a band-shaped member (partner member) in the form of steel belt 63 from both sides. This steel belt 63 extends over the operating stroke of table 12, and both of its ends are clamped by anchor blocks 65 and 66. These anchor blocks 65 and 66 are fastened to bed 11 with bolts 67.

Furthermore, cover 68 that protects braking apparatus 51 is fastened to bed 11.

When electrical power is not applied to piezoelectric actuator 57, brake pads 58 and 59 of braking apparatus 51 are forced in the direction of braking by the resilient restorative force of constricted portions $53f_1$, $53g_1$, $53f_3$ and $53g_3$ (see FIG. 7(a)) of notch enlargement mechanism member 53 to clamp steel belt 63 strongly and perform braking. Conversely, when electrical power is supplied to piezoelectric actuator 57 causing it to extend, each brake pad 58 and 59 moves in the non-braking direction in opposition to their resilient restorative force to release the braking state.

Since this linear motion guiding apparatus is equipped with braking apparatus 51, it is able to completely stop a moving portion that includes table 12 at a desired portion even under conditions in which it is subjected to external vibrations.

In particular, if brake pads 58 and 59 are forced in the braking direction due to the resilient restorative force of constricted portions $53f_1$, $53g_1$, $53f_3$ and $53g_3$ and make contact with steel belt 63, and that contact is made to be canceled by supplying electrical power to piezoelectric actuator 57 causing brake pads 58 and 59 to move in the non-braking direction, braking will be performed reliably even when the supply of electrical power is suddenly interrupted such as in the case of a power outage. Accordingly, inadvertent movement of the moving portion (table 12 and so forth) can be prevented even when the linear motion guiding apparatus is used in a state in which the shaft is upright or nearly upright (in which the direction of operation is vertical).

Furthermore, although braking is made to be performed by interrupting the supply of electrical power to piezoelectric actuator 57 in the present embodiment, conversely, braking can also be made to be performed when electrical power is supplied to piezoelectric actuator 57.

However, braking apparatus 51 is provided with a device that moves brake pads 58 and 59 by enlarging the displacement of linear motion actuator 57. This device has notch enlargement mechanism member 53 itself.

Namely, in FIG. 7(a), with respect to one of the brake pads, brake pad 58 for example, the fulcrum point, power point and acting point of its operation can be considered to be constricted portion $53f_1$, constricted portion $53f_3$ and contact surface 58a of brake pad 58, respectively. In this case, if the distances from the fulcrum point to the power point and from the fulcrum point to the acting point are expressed as $r_1$ and $r_2$, respectively, the displacement enlargement ratio is $r_2/r_1$. In the case of the present embodiment, this displacement enlargement ratio is set to be approximately 2. This is similarly set for the other brake pad 59 as well.

The amount of displacement produced by the operation of piezoelectric actuator 57 is relative small at, for example, a maximum of several tens of $\mu$m. As a result of having this displacement enlargement device, this small amount of displacement can be enlarged to the operating amount required by each brake pad 58 and 59.

A laminated type of piezoelectric actuator is used for piezoelectric actuator 57. This laminated type of piezoelectric actuator has a larger amount of displacement than single layer types, and the use of this type of actuator in combination with the displacement enlargement mechanism described above is useful in terms of increasing the operating stroke of brake pads 58 and 59.

In addition, although the present embodiment uses a band-shaped member in the form of steel belt 63 for the partner member with which brake pads 58 and 59 make contact, the present invention is not limited to this constitution. For example, a linear partner member may also be used. However, the use of a band-shaped member for the partner member increases the contact surface area with the brake pads thereby increasing braking force.

In addition, the steel belt and so forth used for the partner member does not have to be provided separately. For example, track rail 15 and cover 68 may also be used as partner members so that braking is performed by making contact with their sides.

In addition, although notch enlargement mechanism member 53 and friction members in the form of brake pads 58 and 59 are formed separately in braking apparatus 51 and are mutually fastened with bolts in the present embodiment, these may also be formed into a single unit. This is useful in terms of decreasing the number of parts, reducing cost and facilitating assembly.

In addition, although a linear motor is used as the device for driving and positioning table 12 in the present embodiment, various other driving devices can be applied, such as a feed screw mechanism.

In addition, although the linear motion actuator equipped on braking apparatus 51 is composed of a piezoelectric actuator in the present embodiment, an electromagnetic actuator and so forth can also be used.

As has been explained above, according to the present invention, a moving portion can be completely stopped at a desired position even under conditions in which external vibrations and so forth are applied.

In particular, if friction members are forced to make contact with a partner member by means of resilient restorative force, and this contact is made to be canceled by supplying electrical power to a linear motion actuator, braking will be performed reliably during a power outage and so forth. Accordingly, inadvertent movement of the moving portion can be prevented even when the linear motion guiding apparatus is used in a state in which the shaft is upright or nearly upright (in which the direction of operation is vertical).

What is claimed is:

1. A braking apparatus for a linear motion guiding apparatus which comprises a linear motor, a bed and a table that are able to move freely relative to each other and are mutually and respectively coupled to a primary side and a secondary side of said linear motor, and that either one of slows down and stops relative motion of said table with respect to said bed, said braking apparatus comprising:

a partner member, disposed adjacent and connected to said bed, that extends in a direction of the relative movement, a notch enlargement mechanism member disposed adjacent to said table and connected to said table, comprising a linear motion actuator that is linearly displaced by supplying electrical power thereto; and friction members movably supported by said notch enlargement mechanism member;

wherein a displacement of said linear motion actuator causes said notch enlargement mechanism member to move said friction members to make contact with said partner member and perform braking of the linear motion guiding apparatus;

wherein said partner member is a band-shaped member.

2. The braking apparatus for the linear motion guiding apparatus as set forth in claim 1 wherein the notch enlargement mechanism member performs braking by causing the friction members to make contact with the partner member due to their own resilient restorative force when electrical power is not supplied, and cancels braking by activating the linear motion actuator by supplying electrical power to move the friction members away from the partner member.

3. A braking apparatus for the linear motion guiding apparatus as set forth in claim 1 wherein said linear motion actuator comprises a laminated piezoelectric actuator.

4. A braking apparatus for the linear motion guiding apparatus as set forth in claim 1 wherein the friction members and notch enlargement mechanism member are integrated into a single unit.

5. A braking apparatus for a linear motion guiding apparatus, comprising:

a linear motion actuator fixed to said linear motion guiding apparatus, said linear motion actuator being linearly displaced by supplying electrical power thereto; and means for enlarging a displacement of said linear motion actuator to perform braking of said linear motion guide apparatus.

\* \* \* \* \*